United States Patent
Williams

(10) Patent No.: US 9,613,512 B2
(45) Date of Patent: Apr. 4, 2017

(54) EVENT TRIGGER ON WIRELESS DEVICE DETECTION

(71) Applicant: Greenwave Systems PTE. LTD., Singapore (SG)

(72) Inventor: Nathan Williams, San Mateo, CA (US)

(73) Assignee: Greenway Systems PTE LTD, Singapore (SG)

( * ) Notice: Subject to any disclaimer, the term of this patent is extended or adjusted under 35 U.S.C. 154(b) by 0 days.

(21) Appl. No.: 15/081,388

(22) Filed: Mar. 25, 2016

(65) Prior Publication Data

US 2016/0210832 A1 Jul. 21, 2016

Related U.S. Application Data

(63) Continuation of application No. PCT/US2015/027405, filed on Apr. 23, 2015.
(Continued)

(51) Int. Cl.
*G08B 13/00* (2006.01)
*G08B 13/24* (2006.01)
(Continued)

(52) U.S. Cl.
CPC ............ *G08B 13/24* (2013.01); *H04L 12/282* (2013.01); *H04L 63/30* (2013.01); *H04L 63/302* (2013.01);
(Continued)

(58) Field of Classification Search
CPC ..... H04L 63/30; H04L 63/302; H04L 63/304; H04L 12/2803; H04L 12/2823; G08B 13/00; H04W 4/02; H04W 64/00
See application file for complete search history.

(56) References Cited

U.S. PATENT DOCUMENTS 8,098,155 B2   1/2012 Gloo et al.
9,166,732 B2 * 10/2015 Causey .................... H04K 3/65
(Continued)

FOREIGN PATENT DOCUMENTS

KR    1020060118056      11/2006
WO      2013089303 A1     6/2013
WO      2013162303 A1    10/2013

OTHER PUBLICATIONS

Owoskin, Elizabeth, What Secrets Your Phone is Sharing About You, Wall Street Journal, Jan. 13, 2014, retrieved from http://online.wsj.com/news/articles/SB10001424052702303453004579290632128929194 on Apr. 10, 2014.
(Continued)

*Primary Examiner* — Andrew Bee
(74) *Attorney, Agent, or Firm* — Young's Patent Services; Bruce A. Young

(57) ABSTRACT

Messages from wireless devices are intercepted by a controller, such as an access point for a wireless network, a security system controller, a home automation controller, an industrial or business automation controller, or a combination thereof. The controller logs device-identifying information about the devices that sent the messages that that were intercepted. Examples of the device-identifying information include a MAC address, a device name, a brand of the device, an SSID of an AP connected to the device, or a class of device. The intercepted message is used to trigger one or more events, either based solely on intercepting the message or in combination with other parameters.

21 Claims, 5 Drawing Sheets

Related U.S. Application Data

(60) Provisional application No. 61/983,600, filed on Apr. 24, 2014.

(51) Int. Cl.
| | |
|---|---|
| *H04L 29/06* | (2006.01) |
| *H04W 4/12* | (2009.01) |
| *H04W 4/04* | (2009.01) |
| *H04L 12/28* | (2006.01) |
| *H04W 12/12* | (2009.01) |
| *H04W 8/26* | (2009.01) |

(52) U.S. Cl.
CPC ........... *H04L 63/304* (2013.01); *H04W 4/043* (2013.01); *H04W 4/12* (2013.01); *H04W 12/12* (2013.01); *H04W 8/26* (2013.01)

(56) References Cited

U.S. PATENT DOCUMENTS

| | | | |
|---|---|---|---|
| 2010/0145989 A1 | 6/2010 | Cox | |
| 2012/0314018 A1* | 12/2012 | Wengrovitz ........... | H04N 7/181 348/14.08 |
| 2013/0159220 A1 | 6/2013 | Winn et al. | |
| 2013/0196755 A1* | 8/2013 | Nelson ................ | G07F 17/3241 463/29 |
| 2013/0225199 A1 | 8/2013 | Shaw | |
| 2014/0266669 A1 | 9/2014 | Fadell et al. | |
| 2015/0120814 A1 | 4/2015 | Son | |

OTHER PUBLICATIONS

Euclid Analytics, retrieved from www.euclidanalytics.com on Apr. 10, 2014.

Goodin, Dan, DIY stalker boxes spy on Wi-Fi users cheaply and with maximum creep value, ArsTechnica, Aug. 8, 2013, retrieved from http://arstechnica.com/security/2013/08/diy-stalker-boxes-spy-on-wi-fi-users-cheaply-and-with-maximum-creep-value/ on Sep. 23, 2014.

Korean Intellectual Property Office, International Search Report for PCT/US2015/027405, Sep. 11, 2015.

Korean Intellectual Property Office, Written Opinion of the International Searching Authority for PCT/2015/027405, Sep. 11, 2015.

Libelium Smartphone Detection, Retrieved from www.libelium.com/products/meshlium/smartphone-detection on Apr. 10, 2014.

Meshlium Xtreme Datasheet v4.2, Libelium Comunicaciones Distribuuidas S.L., Nov. 2013, retrieved from http://www.libelium.com/downloads/documentation/meshlium_datasheet.pdf on Apr. 10, 2014.

Meshlium Xtreme Technical Guide, Libelium Comunicaciones Distribuuidas S.L., Nov. 2013, retrieved from http://www.scribd.com/doc/217244714/Meshlium-Technical-Guide on Sep. 23, 2014.

Musa, A.B.M et al., Tracking Unmodified Smartphones Using Wi-Fi Monitors, SenSys 2012, Nov. 6, 2012, retrieved from http://www.engr.uic.edu/pub/Bits/Musa/musa-eriksson-sensys12.pdf on Apr. 10, 2014.

Tynan, Dan, Attention Shoppers: Retailers can now track you across the mall, IT World, Jan. 17, 2013, retrieved from http://www.itworld.com/print/336828 on Apr. 10, 2014.

Tynan, Dan, If you shop til you drop, will they track when you come back?, IT World, Jan. 21, 2013, retrieved from http://www.itworld.com/print/337436 on Apr. 10, 2014.

* cited by examiner

EVENT TRIGGER ON WIRELESS DEVICE DETECTION

CROSS-REFERENCE TO RELATED APPLICATIONS

The present application claims priority to International Patent Application PCT/US15/27405, entitled Event Trigger on Wireless Device Detection filed on Apr. 23, 2015 which claimed priority to U.S. Provisional Patent Application No. 61/983,600 entitled Event Trigger on Wireless Device Detection filed on Apr. 24, 2014. The entire contents of which are both hereby incorporated by reference for any and all purposes.

BACKGROUND

Technical Field

The present subject matter relates to wireless devices. More specifically it relates to performing an action based on detection of a wireless device.

Background Art

Mobile battery-powered wireless devices, such as smartphones, tablets, headsets, speakers, fitness tracking devices, smart watches, and the like, have grown to be nearly ubiquitous in modern society. Many people carry one or more such device with them nearly 100% of the time. The type of wireless connection can vary between devices and include radio frequency and/or optical communication technologies. Some devices can only communicate using one wireless communication technology, such as one of the various versions of IEEE 802.11 (Wi-Fi®), various versions of Bluetooth® from the Bluetooth Special Interest Group, cellular phone technologies such as Global System for Mobile Communications (GSM), Code Division Multiple Access (CDMA) or Long Term Evolution (LTE). Some devices include the capability to communicate over multiple wireless technologies. For example a typical smartphone, such as the Samsung® Galaxy S®4 includes one or more radio transceivers capable of communicating using multiple cellular phone technologies at various frequencies, which vary according to the geographic area where the phone is marketed, one or more radio transceivers to communicate over the 2.4 GHz and 5 GHz bands using Wi-Fi technologies, another radio transceiver to communicate over the 2.4 GHz band using Bluetooth technologies, and an infrared transmitter, among others.

Many homes and businesses have a Wi-Fi gateway to allow devices, such as mobile battery-powered wireless devices or other devices such as notebook computers, desktop computers, or printers that include a Wi-Fi network interface, to access a local network and/or to access the internet. Most Wi-Fi gateways support one or more types of security to control which devices are allowed to connect. Examples of Wi-Fi security include Wired Equivalent Privacy (WEP), various versions of Wi-Fi Protected Access (WPA), Media Access Controller (MAC) filtering, not broadcasting the Service Set Identifier (SSID), and other techniques. Some of the Wi-Fi security methods ask a user to enter a code or other authentication into the device before the device is allowed to connect to the Wi-Fi Gateway, while others utilize a characteristic of the device to determine whether or not the device has been previously authorized. Other wireless communication technologies have their own security techniques to prevent unauthorized devices from accessing resources.

Some homes and businesses also include a home security and/or automation system. A typical home security system includes a central monitoring device and sensors to detect unauthorized entry to the premises and/or movement in or around the premises. The central monitoring device can then take action based on input from the sensors such as sounding an alarm, turning on a light, communicating with the police or monitoring service, and/or simply logging the event. A typical home control system includes one or more devices that can be controlled remotely. In some home automation systems, there is a central unit responsible for communicating with the devices to be controlled, but in other systems, the devices communicate over a standard wireless interface, such as Wi-Fi or Bluetooth so that a computer, smartphone, tablet, or other device can directly control the devices. This is sometimes referred to as the internet of things (IoT). In some cases, the devices can even be controlled through the internet from anywhere in the world.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

Figure 1:
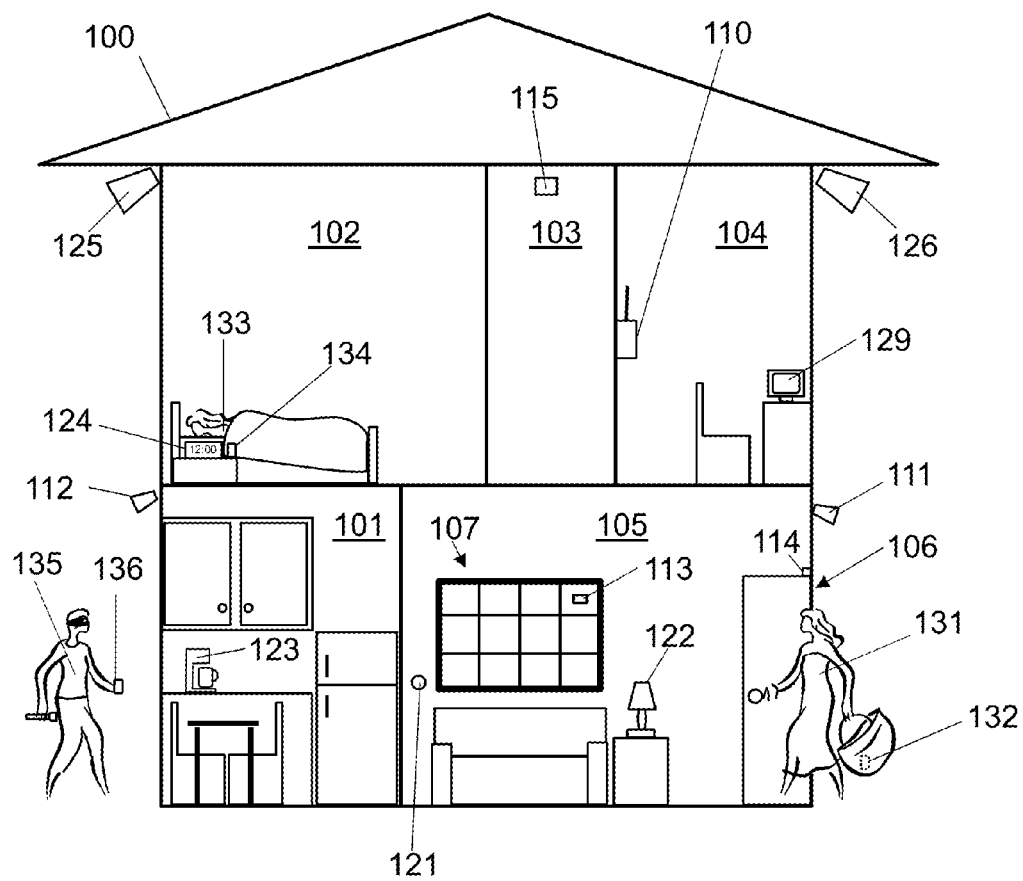
FIG. 1 shows a diagram of a home incorporating one or more embodiments of devices to perform an action based on detection of a wireless device.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

The term "connected" as used herein in regard to wireless networks means that a device has been authorized and/or is capable to send and/or receive data on the wireless network that it is deemed to be connected thereto. If a wireless network has security enabled, a connected device has been authorized by the security protocol. A device is not deemed to be connected to a wireless network simply because it is sending beacon messages, or some other type of query message looking for other devices on the wireless network.

It is possible for a device to be connected to a wireless network while at the same time sending messages on a non-connected wireless network. For example, a device could be connected to an access point with a specific SSID using an 802.11n protocol, while sending beacon messages or other query messages looking for other 801.22n networks. Such a device would be deemed to be connected to the 802.11n wireless network characterized by the specific SSID, but un-connected to other 802.11n wireless networks.

Many mobile wireless devices regularly transmit messages that include identifying information. These messages can be received, or intercepted, by another device and the presence of the transmitting device detected and logged based on the identifying information. The type of message and its frequency of transmission can vary depending on the wireless protocol, the settings of the device, and whether or not the device is actively connected and communicating to another wireless device. As an example, many smartphones with a Wi-Fi radio that is enabled but not connected to an access point (AP) regularly broadcast an ad-hoc network beacon frame that includes the MAC address among other identifying information. If the smartphone is connected to a Wi-Fi AP, the regular communication between the phone and the AP can be intercepted and the MAC address and other information about the smartphone extracted from the intercepted messages. In some cases the smartphone sends messages looking for known APs with a hidden SSID, and some smartphones send messages on a regular basis to find other available APs whether or not they are already connected. Many of these messages are sent without using any encryption of other security measures because the messages are used in a part of the protocol that occurs before any security credentials are authorized. Any type of message sent from the mobile wireless device can be received in various embodiments and identifying information such as the MAC address or device name captured. This information can be used to determine that the particular wireless device with that MAC address or device name was near the receiving device, whether or not the wireless device ever connects to the receiving device.

Other wireless communication protocols have different messages that are sent by a device. For example a Bluetooth device may scan for other devices on a regular basis, including its MAC address and Class of Device (CoD) with each message sent. Devices on many other wireless networks also send messages that include identifying information that can be intercepted by a device with the appropriate radio receiver and software to interpret the message.

In embodiments, the messages from the wireless devices are received by a controller. The controller can be an access point for a wireless network, a security system controller, a home automation controller, an industrial or business automation controller, some other type of device, or a combination thereof, depending on the embodiment. The controller can log information about the devices that sent the messages that that were intercepted. The information logged varies depending on the type of wireless protocol used and the embodiment, but may include one or more of a MAC address, a device name, a network protocol used for the message, a brand of the device, an SSID of an AP connected to the device, a CoD, and/or any other information that was received in the message and/or can be inferred from the received message. The intercepted message can then be used to trigger one or more events, either based solely on receiving the message or in combination with other parameters.

In one example embodiment, the controller is a security system controller that can also act as a Wi-Fi AP or is security system controller in communication with a nearby Wi-Fi AP. Upon being armed, the security system controller has the Wi-Fi AP log all detected devices with time tags showing either a time and date stamp of when the device was detected and/or a range of time when the device was within range of the AP. If a sensor of the security system then indicates an event, such as a window being broken, the time that the sensor event was detected is also tagged with the time and date. Information about the devices that were detected by the AP at or near the time of the sensor event is then reported to the owner of the security system, the monitoring agency, law enforcement, or other person or agency that can then use the information to help find and/or prosecute a suspect for the crime of breaking into the premises. Additional information from the logs can be used to help further identify likely suspects by eliminating the devices that are commonly detected, such as residents and neighbors, from the suspect list of devices. In some cases the identifying information from the device can be used to identify the owner of the device, such as the International Mobile Equipment Indicator (IMEI) or Electronic Serial Number (ESN) of a smartphone which is provided in messages on the cellular radio network and is associated with an account by the service provider. In other cases, the identifying information, such as the MAC address of a Bluetooth device, might not be useful to proactively find the owner of the device, but can be used to later show that a device possessed by an individual was near the premises at the time of the break-in.

In another example embodiment, the controller is a home automation controller that can also act as a Wi-Fi AP or is home automation controller in communication with a nearby Wi-Fi AP. Some of the functions of global positioning services (GPS) based automation can be emulated by the home automation controller without the user enabling GPS tracking on their device, which they may not want to do due to privacy concerns. The identifying information for the smartphones of the residents of the home can be registered with the home automation controller, which can then detect the presence of those smartphones and take action based on their presence, such as turning on exterior lights when a known resident returns home after dark. Registration status refers to information about whether a particular device is registered with the receiving device, such as the home automation controller. If the home automation controller detects that all the registered smartphones are absent, all the lights in the home could be turned off, the thermostat changed to an energy-saving temperature, and the alarm system armed. If the home automation controller detects there are several unregistered devices that have been detected over an extended period on a Friday night, the home automation controller could be set to interpret this situation as a party and the home automation controller could then proactively take action to change the lighting, music, and/or play a video loop of a fireplace on the television. In some cases the home automation controller takes action autonomously based on predefined settings, but in other cases, the home automation controller sends a message to an administrator(s) asking for input on what actions to take.

In various embodiments, the controller is configured to identify registered devices which, in some embodiments, are associated with a profile of an individual, allowing for custom actions to be defined based on the presence or absence of the device. In some cases this registration is associated with authorization of the device to connect to a network, such as being authorized to connect to the Wi-Fi network, but in other cases, the registration is independent of authorizing a connection to the network. In some cases, multiple devices, such as a smartphone and a Bluetooth headset, can be associated with the same profile and actions defined based on subsets of the devices being detected. In some embodiments, actions can be defined based on a combination of registered devices being detected in the same time period. In some embodiments, actions can be defined based on characteristics of the device other than simple detection, such as whether the device is in active use or the signal strength of the message received. In some embodiments, the controller can determine that certain devices are commonly present and should be ignored, such as a wireless printer or a neighbor's smartphone. In some embodiments, the controller can take action based on detection of an unregistered device. Other parameters can be used to establish a context for the detection, such as time of day, duration of detection, whether the registered devices are also detected, and input from other sensors. The context can be used to help determine what action to take in response to the detection of the wireless device. A wide variety of variations are possible within the scope of the description provided herein.

Reference now is made in detail to the examples illustrated in the accompanying drawings and discussed below.

FIG. 1 shows a diagram of a home 100 incorporating one or more embodiments of devices to perform an action based on detection of a wireless device. The example home 100 includes a kitchen 101, a bedroom 102, a hallway 103, an office 104, and a living room 105 with an exterior door 106 and a window 107. A controller 110, which in this embodiment functions as a Wi-Fi access point, a home security controller, and a home automation controller, is located in the office 104. In other embodiments, the controller may not perform all, or any, of those functions, and/or may be in communication with other devices that perform various functions. In at least one embodiment, the controller is embodied as a computer program running on a general purpose computer that is in communication with a device to detect wireless devices and, in some cases, with other devices to perform other actions. The controller 110 has a Wi-Fi radio that can be used to detect Wi-Fi devices in proximity of the home 100, and in some embodiments may also include one or more other wireless receivers to detect devices using wireless protocols other than Wi-Fi.

The home 100 includes several security sensors. Other embodiments of security systems may not include all of these sensors and others may include other types and quantities of sensors. Motion detectors 111, 112 are positioned outside of the home 100 to detect the presence of individuals that are near the home 100. A glass-breaking detector 113 is positioned on the window 107 and a door opening sensor 114 is positioned on the door 106. A siren 115 is positioned in the hallway 103 to provide an audible warning if a break-in is detected. The sensors 111-114 and siren 115 communicate with the controller 110 using either wired or wireless communication as is common for such sensors. In some embodiments, cameras may also be included in the security system and still pictures and/or video may be stored in the controller 110 or in a separate device.

The home 100 includes several devices that can be controlled by the controller 110. Other embodiments may not have all or any of these devices and/or may have other devices that can be controlled by the controller 110. A thermostat 121 is mounted on the wall of the living room 105. The controller 110 can change the set point and heat/cool mode of the thermostat 121. A lamp 122 is positioned in the living room 105 and can be controlled by the controller 110 to be on, off or be set to a dimmed level. A coffee maker 123, or some other type of appliance, in the kitchen 101 can be controlled by the controller 110 to start making coffee or be turned off. A bedside device 124, which includes an audio device, in the bedroom 102 can be configured by the controller 110 to show the correct time, to play music, sound an alarm, and/or relay audible messages from the controller such as "An unknown person has been detected nearby for the last 15 minutes." Exterior floodlights 125, 126 are positioned to illuminate areas near the home 100 and can be turned on and off by the controller 110. In addition, the door 106 may locked or unlocked by the controller 110. A display 129, which can be integrated into the controller 110, be a separate display device, be an app on a smartphone, be a program running on a general purpose computer, or be configured in some other way, is included in the sample home 100. The controller 110 can provide information on the display 129 regarding detected devices and/or actions taken, among other information related to the Wi-Fi AP, the home security system, and the home automation system. The display 129 can also be used for an administrator to configure the controller 110 in some embodiments.

The example home 100 has two residents. The first resident 131 has a smartphone 132 with a first Wi-Fi MAC address, and the second resident 133 has a smartphone 134 with a second Wi-Fi MAC address. The controller 110 is configured with information from the first smartphone 132 and the second smartphone 134, including their Wi-Fi MAC addresses. The first smartphone 132 and the second smartphone 134 have been associated in the controller 110 with profiles for the first resident 131 and the second resident 132, respectively. A third individual 135, with a third smartphone 136 having a third MAC address is also shown, but the third smartphone 136 is not registered with the controller 110 or associated with any profile.

The controller 110 receives the messages from the smartphones 132, 134, 136 whether or not the smartphones 132, 134, 136 are connected to the Wi-Fi AP in the controller 110 as long as the Wi-Fi function of the smartphones 132, 134, 136 is enabled, which is a common default setting. The controller 110 may be configured to take actions based on the detection of devices associated with profiles. As one example, the profile for the first resident 131 may be configured so that if the first smartphone 132, or other device associated with the first resident 131, is detected after a period of absence, the door 106 is unlocked for a short period of time to allow the first resident 131 to enter the home without needing to find her keys. As another example, the controller 110 may be configured so that if both the first resident 131 and the second resident 132 are present in the home 100, as indicated by detection of the first smartphone 132 and second smartphone 134 or other devices associated with their profiles, the thermostat 121 is set to a first temperature that is a compromise between the desires of the two residents. If the first smartphone 132 is detected without the second smartphone 134 being detected, the thermostat 121 is set to a temperature desired by the first resident 131. If the second smartphone 134 is detected without the first smartphone 132 being detected, the thermostat 121 is set to a temperature desired by the second resident 133. But if nether smartphone 132, 134 are detected, the thermostat 121 is set to an energy-saving temperature.

In some embodiments, a time or date can also be used in establishing a context to be used in determining the action to be taken. For example, if the second resident 133 likes coffee, the controller 110 can start the coffee maker 123 at a specific time in the morning, but only if the second resident 133 is present as indicated by the detection of her smartphone 134. As another example or establishing context, if any registered device, such as smartphone 132 or smartphone 134, is detected after being absent for at least a per-determined time, the controller 110 may be configured to turn on the lamp 122 if the time of day is after sunset for that date.

In some embodiments, information from one or more sensors 111-114 can be used in conjunction with the detection of a device, and in some cases time/date, to determine an action. For example if the door sensor 114 indicates that the door 106 has been opened within a short time after the first smartphone 132 is detected after being absent for a period of time, the controller 110 may be configured to not sound the siren 115, even without anyone disarming the alarm function of the controller 110.

A third person 135 in possession of a third smartphone 136 may approach the home 100. The third person 135 may be an intruder, such as a would-be burglar. The third person 135 may approach the home 100 several times over the course of a few days to investigate whether the home 100 is worth breaking into and to see if any of the residents 131, 133 are at home. The controller 110 may detect messages sent from the third smartphone 136 each time that the third person 135 comes in range of the controller 110 and log those detections with a time and date, even though the third smartphone 136 never connects to a wireless network in the home 100. In some embodiments, the controller 110 may report the detection of the third smartphone 136 on the display 129. In some embodiments, input from one or more sensors 111-114 is logged along with the detection information for the third smartphone 136. Depending on the time of day, frequency of detection, input from the exterior motion detectors 111, 112, and/or other factors, the controller 110 may contact the alarm monitoring company or law enforcement about a possible future break-in so that the home 100 can be monitored more closely.

If the third person 135 does break into the home 100 by breaking the window 107, the sensor 113 detects the break-in and reports it to the controller 110 which may sound the alarm 115 whether or not the third smartphone 136 is detected. But in some embodiments, the input from the door sensor 114, and motion detectors 111, 112 may be used in conjunction with the detection of the smartphones 132, 134, 136, and in some cases time-of-day information, to determine what action to take. For example, if it is in the middle of the day with at least one of the residents 131, 133 at home, the detection of an unregistered device, such as the third smartphone 136 may not be deemed suspicious, even if the door sensor 114 indicates that the door has been opened. But if it is late at night, or if no resident is home, then the combination of the door sensor 114 indicating that the door was opened along with the presence of the third smartphone 136 may be cause the controller 110 to sound the siren 115 and send a message to the alarm monitoring company and/or law enforcement that a break-in may have occurred. The message can include the identifying information received from the third smartphone 136, which may help find or at least verify the third person 135 as a suspect in the break-in.

The controller 110 can be configured in many different ways to trigger events based on various scenarios of detection or non-detection of registered devices, such as the first smartphone 132 and second smartphone 134, detection or non-detection of non-registered devices, such as the third smartphone 136, inputs from various sensors 111-114, and time/date information, as well as input from an administrator, such as the first person 131. The actions taken by the controller 110 can vary widely, depending on the embodiment, but may include one or more of logging information, reporting information to an administrator, alarm monitoring company, or law enforcement, sounding an alarm, controlling one of more devices, arming and/or disarming an alarm system, or any other type of action.

Figure 2:
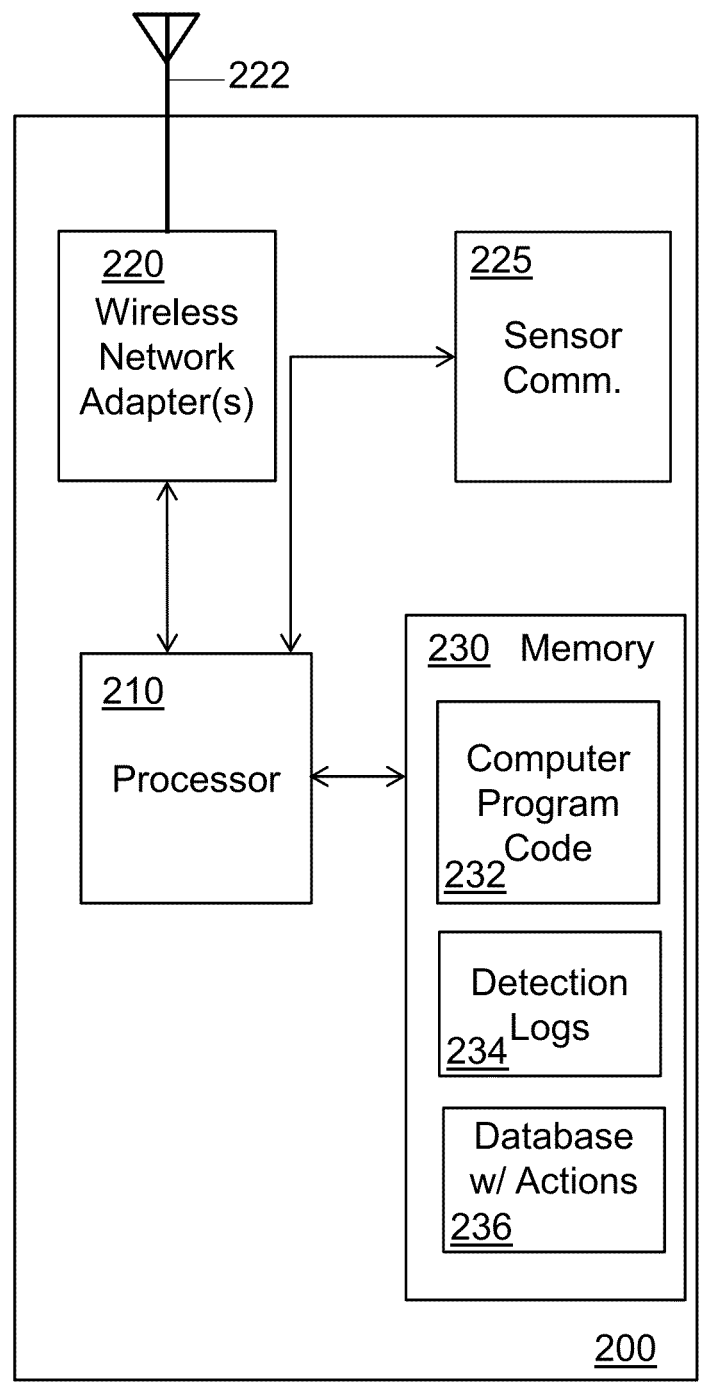
FIG. 2 shows a block diagram of a device suitable for embodiments to perform an action based on detection of a wireless device.

FIG. 2 shows a block diagram of a device 200 suitable for embodiments to perform an action based on detection of a wireless device. The device 200 may be useable as the controller 110 of FIG. 1, or as one or more of an AP for the wireless network, an alarm controller, or a home automation controller. The device 200 includes a processor 210 coupled to a wireless network adapter 220 with antenna 222. In some embodiments, the wireless network adapter 220 may support a single protocol on a single frequency, but in other embodiments, the wireless network adapter 220 may support multiple protocols on multiple frequency bands and include multiple radio transceivers, and/or receivers. The wireless network adapter 220 can receive messages, but may or may not be able to transmit messages, depending on the embodiment. In various embodiments, the wireless network adapter 220 may support any type of radio frequency (RF) or optical wireless protocol at any wavelength or frequency, including, but not limited to, any protocol published by IEEE 802.11 (Wi-Fi) including 802.11-1997 (sometimes called legacy 802.11), 802.11-2007, 802.11-2012, 802.11a, 802.11b, 802.11g, 802.11n, 802.11ac, 802.11ad, 802.11af, 802.11ah, 802.11ai, 802.11aj, 802.11aq, and 802.11ax, any version of Bluetooth including versions 1.0, 1.1, 1.2, 2.0, 2.1, 3.0, 4.0, and 4.1, any protocol published by IEEE 802.15, any version of ZigBee®, any version of Z-Wave®, any version of 6LoWPAN including those using JenNet-IP, constrained application protocol (COAP) or routing protocol for low-power and lossy networks (RPL), any version of WiMAX', and any wireless telephony protocol including GSM, Universal Mobile Telecommunications System (UMTS), High-Speed Downlink Packet Access (HSDPA), CDMA2000®, Evolution-Data Only (EVDO), and LTE.

In some embodiments, the device 200 includes sensor communication circuitry 225. In some embodiments, the sensor communication circuitry 225 may be integrated with the wireless network adapter 220 and communication with the sensors may occur over a wireless communication channel. In other embodiments, the communication with the sensors may occur over a wired communication channel so the sensor communication circuitry 225 may be separate from the wireless network adapter 220. Any type and number of communication channels may be used by the sensor communication circuitry 225 to communicate with any type and number of sensors, which may include, but are not limited to, motion detectors, thermal detectors, pressure sensors, light beam interruption detectors, magnetic or physical switches placed as door/window sensors, glass breakage detectors, audio detectors, still image cameras, and/or video cameras.

Figure 4:
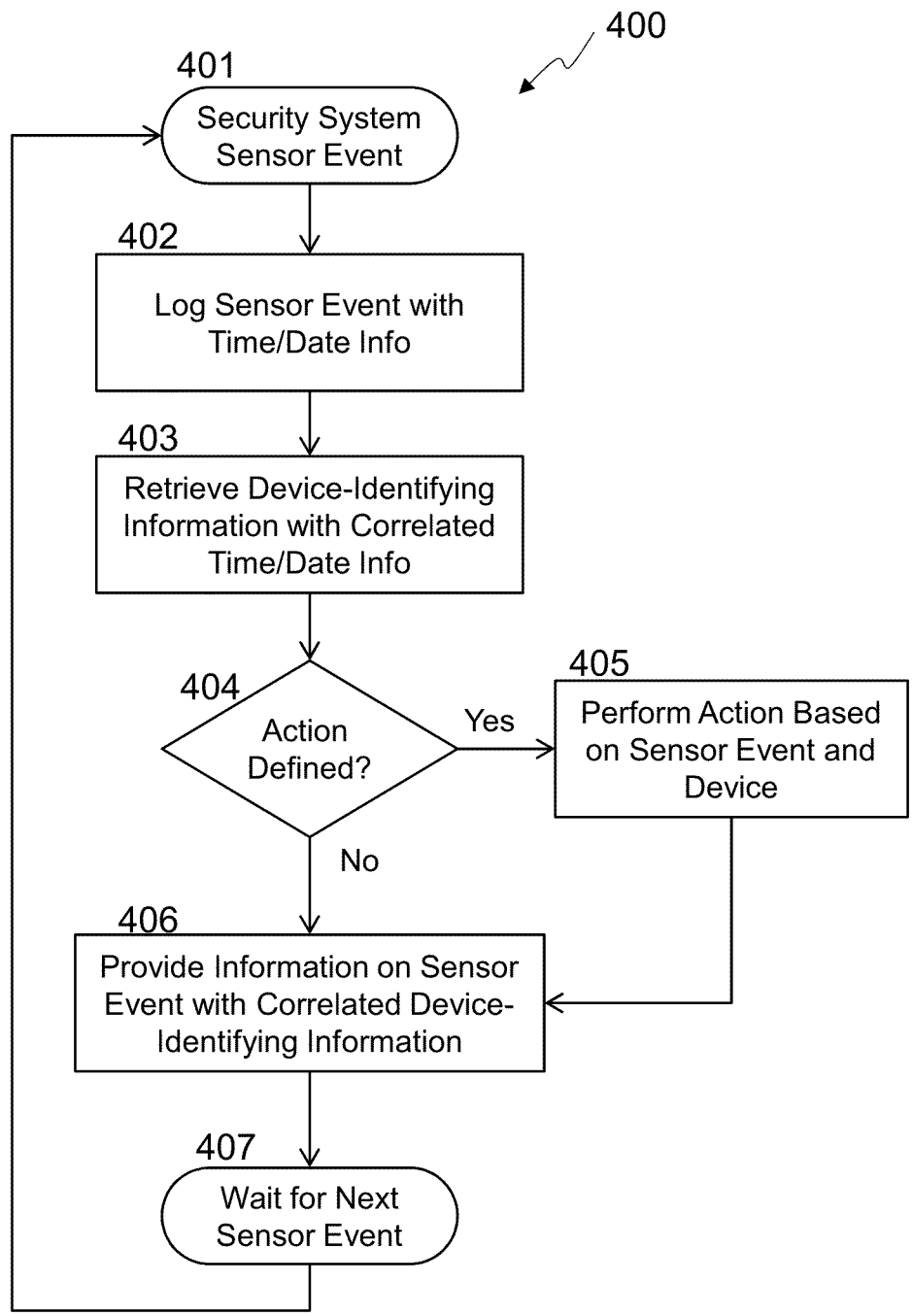
FIG. 4 is a flowchart of an embodiment of a method of performing an action based on both detection of a wireless device and a sensor input.
Figure 5:
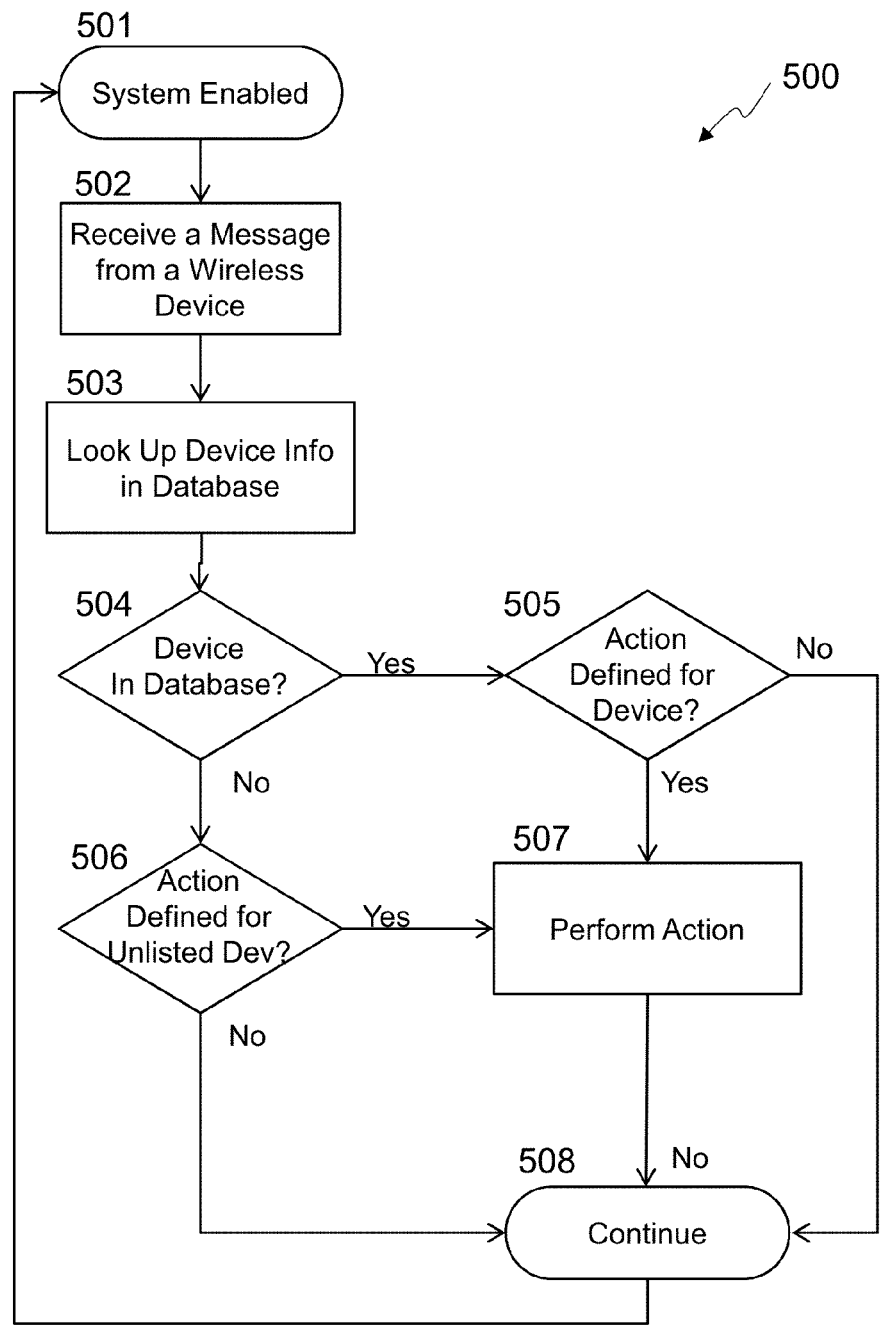
FIG. 5 is a flowchart of an embodiment of a method of performing an action based on detection of a wireless device.

The processor 210 is also coupled to memory 230. The memory 230 includes one or more computer readable media, such as volatile semiconductor memory devices, non-volatile semiconductor memory devices, optical disks, rotating magnetic media, or any other type of non-transitory, volatile or non-volatile, computer readable storage. The memory 230 can be used to store various data, depending on the embodiment. In at least one embodiment, the memory 230 stores at least one computer program 232 with code to trigger an event based on detection of a wireless device. The functionality of example computer programs are shown in the flowcharts of FIG. 3-5.

In some embodiments, detection logs 234 are stored in memory. A detection log 234 includes identifying information received from wireless devices detected by the device 200 and may also include other information inferred about that device and/or time/date/duration of detection. The detection log 234 may also include information about events detected by the various sensors and provided to the device 200 through the sensor communication circuitry. In some embodiments, the detection log 234 stored in memory 230 may only include recent data. Older detection log data may be sent to another location outside of the device 200 for archival storage or may simply be deleted, although some embodiments may store all detection log data outside of the device 200.

In some embodiments, the memory 230 includes a database 236 that includes actions to take in response to various scenarios. In some embodiments, the database 236 may also include the detection logs 234. The database 236 may also include information to register known wireless devices, and profiles of individuals to associate them with various registered wireless devices. The database 236 may also include information about other unregistered wireless devices that have been previously detected and determined to be trusted and able to ignored. The database 236 may include various scenarios of which registered devices, or profiles, are detected/undetected and for what duration, how many unregistered devices are detected for what duration, inputs from various sensors, and/or time/date ranges. The database 236 may also include what actions to take based on the scenarios, such as to send a message with the identifying information from a detected, untrusted, unregistered device, sound a siren, control a light, unlock a door, or any other action that may be accomplished by the device 200.

Figure 3:
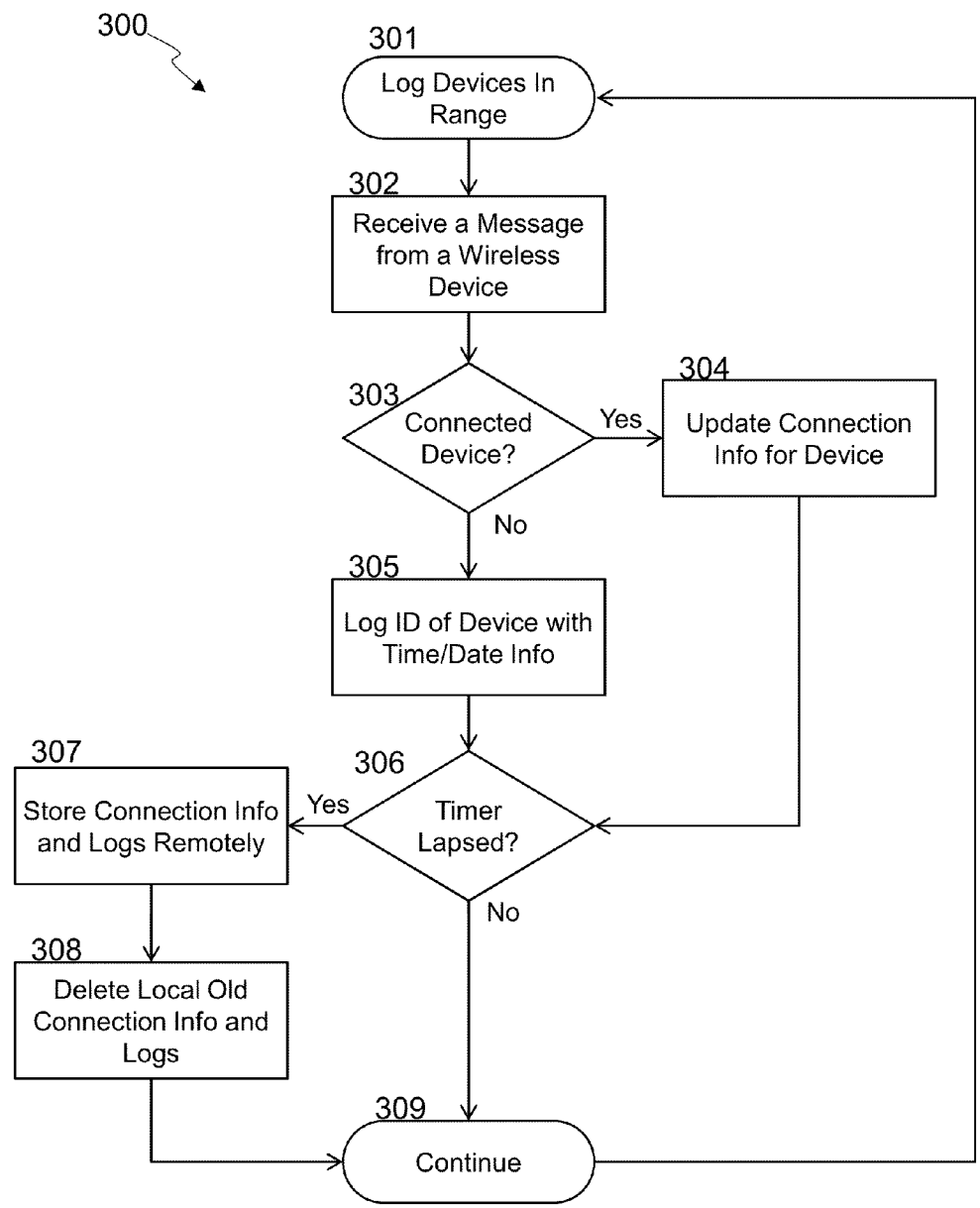
FIG. 3 is a flowchart of an embodiment of a method of logging detected wireless devices.

FIG. 3 is a flowchart 300 of an embodiment of a method of logging detected wireless devices which starts at block 301. A message is intercepted by a receiving device from a wireless device at block 302. The message may or may not be addressed to the receiving device and the wireless device may or may not be connected to the network on which the message is sent. An intercepted message is a message that is received without the knowledge or permission of the transmitting wireless device and/or is a message that is received that was not addressed, or intentionally sent, to the receiving device. Examples of an intercepting a message include, but are not limited to, receiving a message being sent exclusively to other devices, receiving a beacon message, receiving a message looking for a wireless network not connected to by the receiving device, or receiving a message looking for other wireless devices than the receiving device.

The connection status of the wireless device is checked at block 303. The message may be sent by the wireless device while the wireless device is connected to the wireless network or may be beacon messages or other query messages looking for other wireless devices or networks. If the message was sent by a wireless device that is connected to a known wireless network, connection information related to that device is updated at block 304. Connection information may include such information as the time that a connection is made, last communication time, the time that the connection was terminated, or other information related to the connection. In some embodiments, certain wireless devices may be registered and associated with a profile of an individual. In such cases, the connection information may also be associated with the individual.

If the wireless device was not connected to a known network, identifying information from the intercepted message is logged at block 305. In some embodiments, the log also includes a tag indicating the time and/or date that the message was received. A time tag can be any type of information that can be interpreted to indicate one or more of an absolute time, a relative time, a day, a date, a week, a month, or a year. Some embodiments include other types of tags associated with the identifying information. In some embodiments, compression may be used in the log to reduce storage requirements. In some embodiments, a database may be used to store contact type and time for each individual detected wireless device. So the log can take many different forms, including binary data, textual data, or formats compatible with popular applications such as hyper-text mark-up language (HTML), Microsoft Excel®, or Microsoft® Word. In at least one embodiment, the log is implemented as textual overlay of the identifying information received from the wireless device on a recorded video stream.

In some embodiments, a timer is maintained to determine how much log data to retain. This timer is checked at block 306. If the timer has not lapsed, the flowchart continues at block 309 and waits for another message to be intercepted. If the time has lapsed, log data that is older than a pre-determined age may optionally be archived, or stored, remotely at block 307. Log data older then the pre-determined age is then deleted at block 308 and the flowchart continues at block 309.

FIG. 4 is a flowchart 400 of an embodiment of a method of performing an action based on both detection of a wireless device and a sensor input. The flowchart 400 is directed to an example security system, but the concepts shown also apply to other types of systems, such as a home or business automation system. The flowchart 400 begins at block 401 with the detection of an event. The event may be an input from a sensor such as a motion detector, a door/window switch, or any other type of detected event. In some embodiments, the event is logged at block 402 and tagged with time/date information to identify when the event occurred. In at least one embodiment, the event is logged by overlaying textual information about the event, such as "front door opened" at the appropriate time in a recorded video stream.

The flowchart continues at block 403 by retrieving device-identifying information with correlated time/date information from the log of detected devices created by flowchart 300 of FIG. 3. The exact details of what constitutes correlated time/date information may vary according to the embodiment, but in at least one embodiment, any device sending a message within a defined time window around the time that the event was detected is retrieved. In some embodiments, the list of devices is filtered based on whether the device is a registered device, an unregistered but trusted device such as a neighbor's smartphone, or an untrusted detected device.

At block 404 it is determined whether or not an action is defined for the combination of the detected event of block 401 and the set of detected devices correlated with that event. If an action is defined, the action is performed at block 405. One example of defining an action based on the example home 100 shown in FIG. 1 is to turn on lamp 122 in response to the door switch 114 showing that the door 106 has opened if any registered device 132, 134 has been detected less than 5 minutes before the door switch 114 opens. In some embodiments, additional criteria can be used, such as the time being after sunset for that date to qualify the action further. Another example of defining an action is to turn on the exterior floodlights 125, 126 if an unregistered device 136 is detected in a window starting 15 minutes before, and ending 15 minutes after, a motion detector 111, 112 detects motion.

In some embodiments, information about the sensor event and correlated device-identifying information is provided to an interested party at block 406, such as a resident of the home being monitored, an employee of the business being monitored, an administrator of the security system, a monitoring service for the security system and/or law enforcement. The information can be provided in any form, including, but not limited to, a textual message provided on a display or sent by short-message-service (SMS), e-mail, fax, or through a smartphone app, an audio message provided through a speaker or delivered through a telephone system or through a smartphone app, an entry into a database, or superimposed textual information on a live or recorded video stream. At block 407, the flowchart waits for the next sensor event.

FIG. 5 is a flowchart 500 of an embodiment of a method of performing an action based on detection of a wireless device. The system is enabled at block 501 and a message is intercepted from a wireless device at block 502. The message may not be directed at the system; the system may intercept the message without the knowledge or permission of the wireless device. The message may include identifying information about the wireless device, such as MAC address, device name, CoD, or ESN/IMEI. Other information related to the message such as signal strength and/or time/date may also be determined. One or more tags may also be logged, or stored, associated with the identifying information. Examples of tags include, but are not limited to a time tag, a network protocol for the message, a signal strength, a duration of detection of the wireless device, a frequency of detection of the wireless device, or registration status of the wireless device with the receiving device At block 503, the identifying information is used to access a database of registered or otherwise identified devices and a determination made at block 504 whether the device is in the database. Registered devices are known devices that may be associated with a profile of an individual. Other identified devices may include previously detected untrusted devices or known devices to ignore, such as a local wireless printer, and/or devices very commonly detected which are unknown, such as a neighbor's smartphone, where a determination has been made that the device is trusted and should be ignored.

If the device is in the database, a determination is made whether an action is defined upon detection of the particular device at block 505. In some embodiments, additional information can be used to further define any action to be taken. Any defined action is then performed at block 507. If the device is not in the database, a determination is made as to whether an action is defined upon detection of an unknown device at block 506. In some embodiments, additional information can be used to further define any action to be taken. Any defined action is then performed at block 507. Various types of actions can be defined in response to detection of wireless devices, some of which have been previously described. In some embodiments, a wide variety of qualifiers can be used to further determine an action. The flowchart 500 continues at block 508 by resuming the flowchart.

As will be appreciated by those of ordinary skill in the art, aspects of the various embodiments may be embodied as a system, method or computer program product. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "circuitry," "block," "motion sensor," or "system." Furthermore, aspects of the various embodiments may take the form of a computer program product embodied in one or more computer readable medium(s) having computer readable program code stored thereon.

Any combination of one or more computer readable storage medium(s) may be utilized. A computer readable storage medium may be embodied as, for example, an electronic, magnetic, optical, electromagnetic, infrared, or semiconductor system, apparatus, or device, or other like storage devices known to those of ordinary skill in the art, or any suitable combination of computer readable storage mediums described herein. In the context of this document, a computer readable storage medium may be any tangible medium that can contain, or store a program and/or data for use by or in connection with an instruction execution system, apparatus, or device.

Computer program code for carrying out operations for aspects of various embodiments may be written in any combination of one or more programming languages, including an object oriented programming language such as Java, Smalltalk, C++, or the like, and conventional procedural programming languages, such as the "C" programming language or similar programming languages. In accordance with various implementations, the program code may execute entirely on the processor of an embodiment, partly on the processor of an embodiment and partly on another processor that may be local or remote to the motion sensor, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Some embodiments may be a stand-alone software package.

The computer program code, if executed by a processor causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Examples of various embodiments are described in the following paragraphs:

An example apparatus includes a processor, a wireless receiver coupled to the processor, and a memory coupled to the processor. In the example apparatus, the processor is configured to intercept a message from a wireless device with the wireless receiver, extract identifying information about the wireless device from the message, and perform an action based on the identifying information. In some example apparatuses, the processor is further configured to store the identifying information with one or more associated tags in the memory. In some example apparatuses, the one or more associated tags comprise a network protocol, a signal strength, a duration of detection of the wireless device, a frequency of detection of the wireless device, or registration status of the wireless device with the receiving device. In some example apparatuses, the one or more associated tags comprise a time tag. In some example apparatuses, the processor is further configured to determine that the identifying information is older than a predetermined age based on the time tag, store a copy of the identifying information with the one or more associated tags in a remote location, and delete the identifying information and the one or more associated tags from the memory. Some example apparatuses also include sensor communication circuitry coupled to the processor. In some example apparatuses, the processor is further configured to receive a sensor input with the sensor communication circuitry, determine a time of the sensor input, correlate the time of the sensor input with the time tag associated with the identifying information, and perform the action based, in part, on the correlation of the time of the sensor input with the time tag associated with the identifying information. In some example apparatuses, the processor is further configured to store the sensor input associated with the identifying information in the memory. In some example apparatuses, the processor is further configured to send an alarm message as at least a part of the action. In some example apparatuses, the alarm message includes information based on the identifying information and the sensor input. In some example apparatuses, the processor is further configured to establish a context for a time that the message is intercepted, and perform the action based on the identifying information and the context. In some example apparatuses, the context comprises a time of day, information from a profile associated with the identifying information, other intercepted messages, or an elapsed time since a previous message interception. In some example apparatuses, the processor is further configured to access a profile associated with the identifying information, and perform the action based, in part, on information from the profile. In some example apparatuses, the processor is further configured to control another device as at least a part of the action. In some example apparatuses, the processor is further configured to overlay text based on the identifying information on a video stream as at least a part of the action. In embodiments, any combination of the elements described in this paragraph can be used.

An example method to trigger an action based on detection of a wireless device includes intercepting a message from a wireless device by a wireless receiver, extracting identifying information about the wireless device from the message, and triggering an action based on the identifying information. Some example methods include storing the identifying information with one or more associated tags. In some example methods the one or more associated tags comprise a network protocol, a signal strength, a duration of detection of the wireless device, a frequency of detection of the wireless device, or registration status of the wireless device with the receiving device. In some example methods the one or more associated tags comprise a time tag. Some example methods include receiving a sensor input at sensor communication circuitry, determining a time of the sensor input, correlating the time of the sensor input with the time tag associated with the identifying information, and performing the action based, in part, on the correlation of the time of the sensor input with the time tag associated with the identifying information. Some example methods include storing the sensor input associated with the identifying information. Some example methods include sending an alarm message as at least a part of the action. In some example methods the alarm message includes information based on the identifying information and the sensor input. Some example methods include establishing a context for a time that the message is intercepted, and performing the action based on the identifying information and the context. In some example methods the context comprises a time of day, information from a profile associated with the identifying information, other intercepted messages, or an elapsed time since a previous message interception. Some example methods include accessing a profile associated with the identifying information, and performing the action based, in part, on information from the profile. Some example methods include controlling a device as at least a part of the action. Some example methods include overlaying text based on the identifying information on a video stream as at least a part of the action. In embodiments, any combination of the elements described in this paragraph can be used.

An example computer program product for detecting human motion within an infrared detection area includes at least one non-transitory computer readable storage medium having computer readable program code embodied therewith. In the example computer program product the computer readable program code includes computer readable code to intercept a message from a wireless device using a wireless receiver, computer readable code to extract identifying information about the wireless device from the message, and computer readable code to perform an action based on the identifying information. Some example computer program products include computer readable code to store the identifying information with one or more associated tags in a local memory. In some computer program products the one or more associated tags comprise a network protocol, a signal strength, a duration of detection of the wireless device, a frequency of detection of the wireless device, or registration status of the wireless device with the receiving device. In some computer program products the one or more associated tags comprise a time tag. Some example computer program products include computer readable code to determine that the identifying information is older than a predetermined age based on the time tag, computer readable code to store a copy of the identifying information with the one or more associated tags in a remote location, and computer readable code to delete the identifying information and the one or more associated tags from the local memory. Some example computer program products include computer readable code to receive a sensor input using sensor communication circuitry and determine a time of the sensor input, computer readable code to correlate the time of the sensor input with the time tag associated with the identifying information, and computer readable code to perform the action based, in part, on the correlation of the time of the sensor input with the time tag associated with the identifying information. Some example computer program products include readable code to store the sensor input associated with the identifying information in the local memory. Some example computer program products include computer readable code to send an alarm message as at least a part of the action. In some computer program products the alarm message includes information based on the identifying information and the sensor input. Some example computer program products include computer readable code to control another device as at least a part of the action. Some example computer program products include computer readable code to overlay text based on the identifying information on a video stream as at least a part of the action. In embodiments, any combination of the elements described in this paragraph can be used.

An example security system includes a controller, one or more sensors coupled to the controller, a wireless receiver coupled to the controller, and a communication interface coupled to the controller. The example security system is configured to intercept a message from a wireless device using the wireless receiver, extract identifying information about the wireless device from the message, log the identifying information associated with a time tag, receive an event from a sensor of the one or more sensors, determine a time of the event, correlate the time of the event with the time tag associated with the identifying information, and send an alarm message over the communication interface to an interested party based on the correlation of the time of the event with the time tag associated with the identifying information, wherein the alarm message comprises information based on the identifying input and the event. Some example systems are further configured to log one or more additional tags associated with the identifying information, the one or more additional tags comprising a network protocol, a signal strength, a duration of detection of the wireless device, a frequency of detection of the wireless device, or registration status of the wireless device with the receiving device. Some example systems also include a local memory, In some example systems the identifying information is logged in the local memory. Some example systems are configured to determine that the identifying information is older than a predetermined age based on the time tag, store a copy of the identifying information with the one or more associated tags in a remote location, and delete the identifying information from the local memory. Some example systems are configured to log the event and the time of the event. Some example systems are further configured to access a profile associated with the identifying information, and send the alarm message based, in part, on information from the profile. Some example systems are further configured to control a home automation device. Some example systems are further configured to overlay text based on the identifying information or the event on a video stream. In some example systems the communication interface includes the wireless receiver. In some example systems the one or more sensors comprise a motion detector, a thermal detector, a pressure sensor, a light beam interruption detector, a door/window open sensor, a glass breakage detector, or an audio detector. In embodiments, any combination of the elements described in this paragraph can be used.

An example home automation system includes a controller, a home automation device coupled to the controller, and a wireless receiver coupled to the controller. The example system is configured to intercept a message from a wireless device using the wireless receiver, extract identifying information about the wireless device from the message, control the home automation device based on the identifying information. Some example systems are further configured to log the identifying information with one or more associated tags. In some example systems the one or more additional tags comprise a time tag, a network protocol, a signal strength, a duration of detection of the wireless device, a frequency of detection of the wireless device, or registration status of the wireless device with the receiving device. Some example systems are further configured to establish a context for a time that the message is intercepted, and control the home automation device based on the identifying information and the context. In some example systems the context comprises a time of day, information from a profile associated with the identifying information, other intercepted messages, an elapsed time since a previous message interception, or the one of more associated tags. Some example systems are further configured to access a profile associated with the identifying information, and control the home automation device based on the identifying information and information from the profile. In some example systems the one or more home automation devices comprise a thermostat, a kitchen appliance, an audio device, a light, a display, or a door lock. In embodiments, any combination of the elements described in this paragraph can be used.

An example apparatus to perform an action based on detection of a wireless device includes means for intercepting a message from a wireless device, means for extracting identifying information about the wireless device from the message, and means for triggering an action based on the identifying information. Some apparatuses also include means for storing the identifying information with one or more associated tags. In some apparatuses the one or more associated tags comprise a network protocol, a signal strength, a duration of detection of the wireless device, a frequency of detection of the wireless device, or registration status of the wireless device with the receiving device. In some apparatuses the one or more associated tags comprise a time tag. Some apparatuses also include means for receiving a sensor input, means for determining a time of the sensor input, means for correlating the time of the sensor input with the time tag associated with the identifying information, and means for performing the action based, in part, on the correlation of the time of the sensor input with the time tag associated with the identifying information. Some apparatuses also include means for storing the sensor input associated with the identifying information. Some apparatuses also include means for sending an alarm message as at least a part of the action. In some apparatuses the alarm message includes information based on the identifying information and the sensor input. Some apparatuses also include means for establishing a context for a time that the message is intercepted, and means for performing the action based on the identifying information and the context. In some apparatuses the context comprises a time of day, information from a profile associated with the identifying information, other intercepted messages, or an elapsed time since a previous message interception. Some apparatuses also include means for accessing a profile associated with the identifying information, and means for performing the action based, in part, on information from the profile. Some apparatuses also include means for controlling a device as at least a part of the action. Some apparatuses also include means for overlaying text based on the identifying information on a video stream as at least a part of the action. In embodiments, any combination of the elements described in this paragraph can be used.

As used in this specification and the appended claims, the singular forms "a", "an", and "the" include plural referents unless the content clearly dictates otherwise. Thus, for example, reference to an element described as "a monitored volume" may refer to a single monitored volume, two monitored volumes, or any other number of monitored volumes. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between. Any element in a claim that does not explicitly state "means for" performing a specified function, or "step for" performing a specified function, is not to be interpreted as a "means" or "step" clause as specified in 35 U.S.C. §112(f).

The description of the various embodiments provided above is illustrative in nature and is not intended to limit the invention, its application, or uses. Thus, different variations beyond those described herein are intended to be within the scope of the embodiments of the present invention. Such variations are not to be regarded as a departure from the intended scope of the present invention. As such, the breadth and scope of the present invention should not be limited by the above-described exemplary embodiments, but should be defined only in accordance with the following claims and equivalents thereof.

What is claimed is:

1. An apparatus comprising:
a processor;
sensor communication circuitry coupled to the processor;
a wireless receiver coupled to the processor; and
a memory coupled to the processor;
wherein the processor is configured to:
    intercept a message from a wireless device with the wireless receiver;
    extract identifying information about the wireless device from the message;
    access registration information to determine a registration status of the wireless device based on the identifying information;
    store the identifying information with one or more associated tags in the memory, wherein the one or more associated tags comprise a time tag;
    receive a sensor input with the sensor communication circuitry;
    determine a time of the sensor input;
    correlate the time of the sensor input with the time tag associated with the identifying information; and
    perform an action based, at least in part, on the registration status of the wireless device and the correlation of the time of the sensor input with the time tag associated with the identifying information.

2. The apparatus of claim 1, wherein the processor is further configured to send an alarm message as at least a part of the action, the alarm message including the identifying information only if the registration status of the wireless device is unregistered.

3. The apparatus of claim 1, the registration information comprising predetermined information that is independent of an authorization for the wireless device to connect to the wireless receiver, the predetermined information different than the identifying information about the wireless device.

4. The apparatus of claim 1, the registration information comprising a profile of an individual associated with the wireless device, the profile comprising more than the identifying information about the wireless device.

5. The apparatus of claim 1, wherein the one or more associated tags further comprise the registration status of the wireless device, the sensor input, a network protocol, a signal strength, or a duration of detection of the wireless device.

6. A method to perform an action based on detection of a wireless device, the method comprising:
intercepting a message from a wireless device by a wireless receiver;
extracting identifying information about the wireless device from the message;
accessing registration information to determine a registration status of the wireless device based on the identifying information;
storing the identifying information with a time tag;
receiving a sensor input at sensor communication circuitry;
determining a time of the sensor input;
correlating the time of the sensor input with the time tag associated with the identifying information; and
performing the action based, at least in part, on the registration status of the wireless device and the correlation of the time of the sensor input with the time tag associated with the identifying information.

7. The method of claim 6, further comprising storing the sensor input, a network protocol, a signal strength, the registration status, or a duration of detection of the wireless device with the identifying information.

8. The method of claim 6, further comprising sending an alarm message as at least a part of the action.

9. The method of claim 8, wherein the alarm message includes information based on the identifying information and the sensor input.

10. The method of claim 8, further comprising including the identifying information in the alarm message only if the registration status of the wireless device is unregistered.

11. The method of claim 6, further comprising:
receiving a user input related to the wireless device;
determining at least a portion of the registration information based on the user input; and
storing the registration information.

12. The method of claim 6, further comprising:
receiving a profile of an individual associated with the wireless device, the profile comprising more than the identifying information about the wireless device;
storing the profile of the individual as at least a portion of the registration information;
using the profile of the individual, in addition to the identifying information, to determine the registration status of the wireless device.

13. A computer program product for performing an action based on detection of a wireless device, the computer program product comprising:
at least one non-transitory computer readable storage medium having computer readable program code embodied therewith, the computer readable program code comprising:
computer readable code to intercept a message from a wireless device using a wireless receiver;
computer readable code to extract identifying information about the wireless device from the message;
computer readable code to access registration information to determine a registration status of the wireless device based on the identifying information;
computer readable code to store the identifying information with one or more associated tags in a local memory, wherein the one or more associated tags comprise a time tag;
computer readable code to receive a sensor input using sensor communication circuitry and determine a time of the sensor input;
computer readable code to correlate the time of the sensor input with the time tag associated with the identifying information; and
computer readable code to perform the action based, at least in part, on the registration status of the wireless device and the correlation of the time of the sensor input with the time tag associated with the identifying information.

14. The computer program product of claim 13, further comprising computer readable code to store the sensor input associated with the identifying information in the local memory.

15. The computer program product of claim 13, further comprising computer readable code to send an alarm message as at least a part of the action.

16. The computer program product of claim 15, further comprising computer readable code to include information based on the identifying information in the alarm message only if the registration status of the wireless device is unregistered.

17. A security system comprising:
a controller;
one or more sensors coupled to the controller;
a wireless receiver coupled to the controller; and
a communication interface coupled to the controller;
wherein the system is configured to:
intercept a message from a wireless device using the wireless receiver;
extract identifying information about the wireless device from the message;
access registration information that was entered by a person to determine a registration status of the wireless device based on the identifying information;
log the identifying information associated with a time tag;
receive an event from a sensor of the one or more sensors;
determine a time of the event;
correlate the time of the event with the time tag associated with the identifying information; and
send an alarm message over the communication interface to an interested party based on the registration status of the wireless device being unregistered and the correlation of the time of the event with the time tag associated with the identifying information, wherein the alarm message comprises information based on the identifying information and the event.

18. The security system of claim 17, further comprising a local memory;
wherein the identifying information the time tag associated with the identifying information, a tag representing the registration status of the wireless device, the event, and the time of the event are logged in the local memory.

19. The security system of claim 18, wherein the system is further configured to:
determine that the identifying information is older than a predetermined age based on the time tag;
store a copy of the identifying information with the one or more associated tags in a remote location; and
delete the identifying information from the local memory.

20. The security system of claim 17, wherein the communication interface includes the wireless receiver.

21. The security system of claim 17, wherein the one or more sensors comprise a motion detector, a thermal detector, a pressure sensor, a light beam interruption detector, a door/window open sensor, a glass breakage detector, or an audio detector.

* * * * *